A. W. HOARE.
ANIMAL TRAP.
APPLICATION FILED DEC. 18, 1919.
1,376,695.
Patented May 3, 1921.
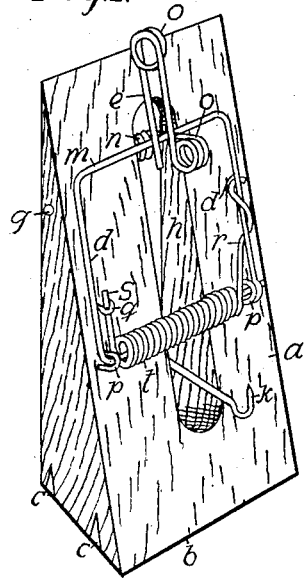
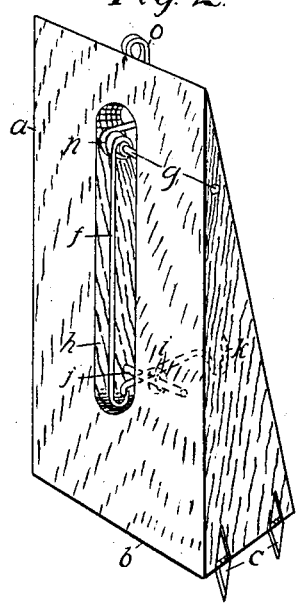
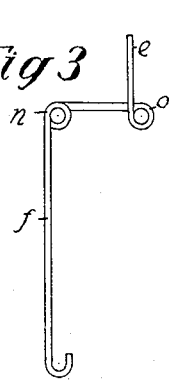
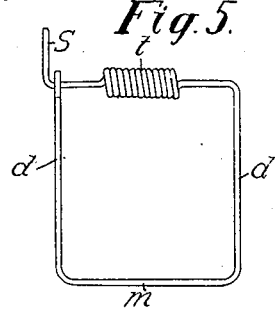
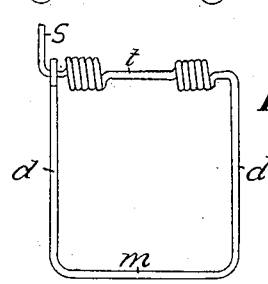
Inventor
Arthur William Hoare
By B. Singer, Atty.

UNITED STATES PATENT OFFICE.

ARTHUR WILLIAM HOARE, OF SHOREHAM, ENGLAND.

ANIMAL-TRAP.

1,376,695.

Specification of Letters Patent.    Patented May 3, 1921.

Application filed December 18, 1919. Serial No. 345,763.

*To all whom it may concern:*

Be it known that I, ARTHUR WILLIAM HOARE, subject of the King of Great Britain, residing at Shoreham, in the county of Sussex, England, have invented new and useful Improvements in Animal-Traps, of which the following is a specification.

This invention relates to animal traps of the kind commonly employed for snaring rodents such as mice and rats wherein a strong spring actuates a bridle-piece or loop on the release of a trigger that is used to retain the trap in its opened or set position, said trigger being baited in order to induce the animal to be snared thereby, the quick action of the said bridle-piece effecting the desired result.

In such traps it is essential that the trigger-release is of a very sensitive character and that no elements of suspicion exist whereby the animal may be deterred from attempting to take the bait and so actuate the trigger mechanism.

The object of the present invention is to improve these conditions whereby the efficiency of the trap is increased, and for this purpose the mechanism is mounted in such a manner that an inclined surface is presented to the animal to be snared, the end of the trigger-release being situated toward the base so as to be the foremost and most accessible object to the rodent.

A trap constructed in accordance with the present invention is illustrated in the accompanying sheet of drawings, in which Figure 1 is a perspective front view, Fig. 2 a similar back view, while Figs. 3 and 4 are alternative constructions of the catch held by the trigger for the retention of the spring bridle-piece in the opened or "set" position, and Figs. 5 and 6 modified forms of the spring bridle-piece.

Referring now to Figs. 1 and 2, $a$ represents a block of wood or other suitable material, preferably of triangular form but may be of any convenient shape with a base $b$ so that the trap may be stood in the vertical position, and in order to secure the same to the surface upon which it is placed there may be provided hinged spikes $c$ that are capable of being turned down and thrust into the surface to withstand resistance offered by rodents, such as rats. Hingably attached to the face of the block $a$ is the spring bridle-piece $d$ that is retained in the opened or "set" position by the top part $e$ of the catch which is provided with a depending member $f$ and mounted on the axis $g$ that passes across the slot $h$ formed in the block $a$. The trigger $i$ is similarly mounted on the axis $j$ situated toward the lower end of the slot $h$, one end of the trigger $i$ engaging with the depending member $f$ of the catch, while the other end projects through and extends beyond the face of the block $a$ terminating in a hook $k$ or otherwise for the reception of the bait. The several parts are illustrated in Figs. 1 and 2 in the "set" position, and it will be easily understood that on the slightest movement taking place at the hook $k$, presumably by the rodent gnawing the bait, the trigger $i$ will become disengaged from the depending member $f$ of the catch whereby the spring bridle-piece $d$ will be released and quickly turn over breaking the neck of the animal which will be held between the lower surface of the block $a$ and horizontal member $m$ of the spring bridle-piece $d$. It will be observed that the catch is made up of the depending member $f$ aforesaid, a scroll or coil of wire $n$, that may be bushed by a ferrule to accommodate the axis $g$, and the upward extension or top part $e$, which is also provided with scrolls of wire $o$ or the like to afford a certain amount of resilience to the end which facilitates not only the action of the trigger-release but the setting of the trap.

As distinguished from that form illustrated in Fig. 1, reference is directed to the alternatives shown in Figs. 3 and 4 in which similar letters relate to like parts to afford the desired resilience to the respective ends $e$ and $f$ as hereinbefore described.

The spring bridle-piece $d$ may be mounted on the face of the block $a$ in any convenient manner for example as shown in Fig. 1 by the staples $p$ one end $s$ of the coiled wire spring $t$ being anchored at $q$, while the opposite end $r$ is twisted around the vertical member of the bridle-piece $d$ for the purpose of effecting the quick turning movement on the release of the trigger mechanism.

Modifications of the construction of this spring bridle-piece are shown in Figs. 5 and 6, in which similar letters of reference relate to like parts; but obviously many forms may be adopted without departing from the nature of my invention.

Claim:

An animal trap comprising a vertically disposed block with a slot therethrough, presenting an inclined surface toward the animal to be snared, on the face of which is mounted a spring actuated bridle-piece that is retained in the "set" position by the top part of an oscillatory catch by means of its depending member engaging a trigger carrying a bait hook that projects through said slot, said top part and depending member of said oscillatory catch having a resiliency provided in its structure by the interposition of convolutions of wire as an integral part thereof substantially as described.

In witness whereof I affix my signature.

ARTHUR WILLIAM HOARE.